April 21, 1964          H. A. LONG          3,129,563
PRESSURE RATIO SENSING DEVICE
Filed Feb. 2, 1955
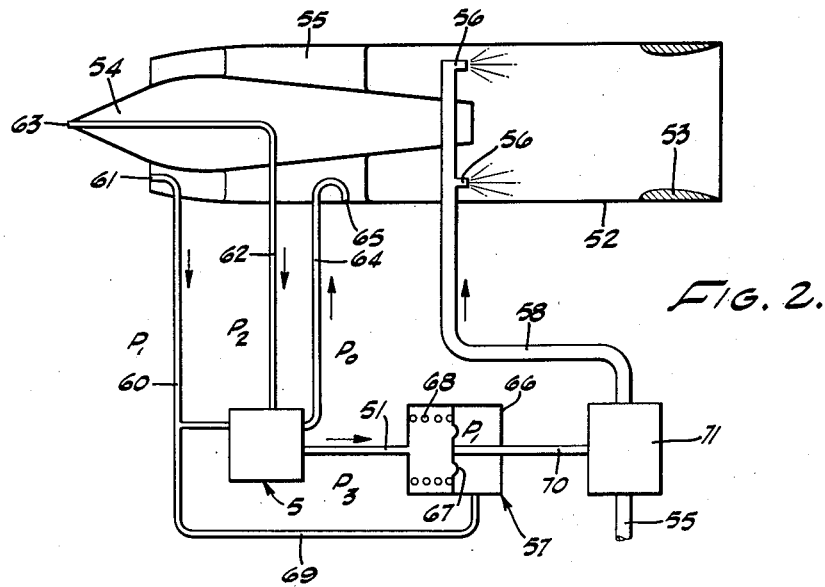
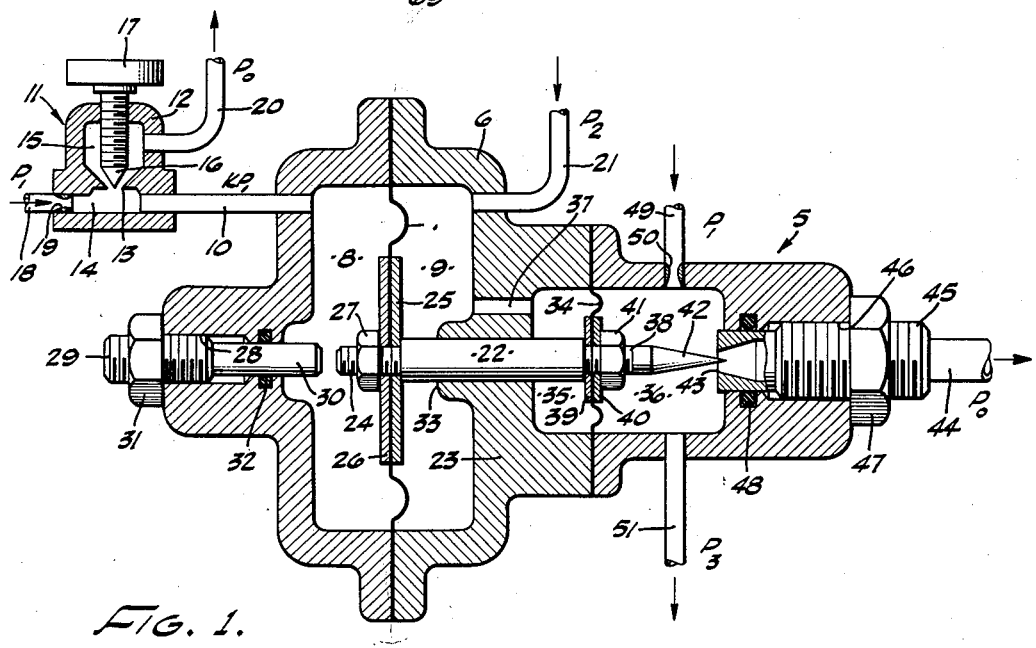
HENRY A. LONG
INVENTOR.
BY R. E. Geauque
ATTORNEY 3,129,563
PRESSURE RATIO SENSING DEVICE
Henry A. Long, Van Nuys, Calif., assignor to The
Marquardt Corporation, a corporation of California
Filed Feb. 2, 1955, Ser. No. 485,760
5 Claims. (Cl. 60—39.28)

This invention relates to a pressure ratio sensing device and more particularly to a device which derives a signal from two pressures and the ratio of this signal to one of the pressures is proportional to the ratio of the two pressures.

In previous devices, a constant pressure ratio has been maintained by utilizing a diaphragm having an evacuated area on one side so that the two pressures of the ratio acting on different areas on opposite sides of the diaphragm produce a control movement when the ratio deviates from the constant value. In these devices, it is necessary to vary one of the pressures of the ratio in response to the control movement in order to close the control loops. In other prior devices, a control pressure proportional to a pressure ratio has been obtained directly by comparing one of the pressures of the ratio with a fraction of the other pressure received from a pressure probe in a De Laval nozzle. The position of the pressure probe gives a pressure which is a direct indication of the pressure ratio. However, such devices are complicated to construct and calibrate.

In the present invention, a diaphragm has a fraction of the higher pressure ($P_1$) of the ratio acting on one side and has the lower pressure ($P_2$) of the ratio acting on the other side. This diaphragm is also connected to an air spring comprised of a diaphragm which receives the lower pressure ($P_2$) of the ratio on one side and on the other side, receives a pressure ($P_3$) intermediate the orifices of a pressure divider device connected to the higher pressure ($P_1$) of the ratio. The operation of the pressure divider device is disclosed in U.S. Patent No. 2,645,240 to John A. Drake dated October 11, 1948, wherein it is disclosed that the pressure ($P_3$) intermediate the orifice is a function of the introduced pressure ($P_1$) and the ratio of the throat area of the inlet and outlet orifices. The diaphragm of the air spring carries a needle for varying the throat area of one of the orifices of the pressure divider device so that the ratio of pressure $P_3$ to the pressure $P_1$ will vary with pressure ratio $P_2/P_1$ and the pressure $P_3$ can therefore be utilized directly as a control pressure.

This control pressure can be utilized to control the flight Mach number of an aircraft propelled by a jet engine since flight Mach number can be measured by any one of a number of presure ratios of the engine. By controlling a fuel regulator with the control pressure, it is possible to reduce the engine thrust to the cruise thrust value as the cruise Mach number is approached, and after the selected pressure ratio reaches a predetermined value, the fuel flow rate is then controlled to produce a constant thrust corresponding to the cruise value. The control pressure can also be utilized to control any type of process in accordance with the ratio of any two pressures and the magnitude of one of the pressures.

It is therefore an object of the present invention to provide a simple pressure ratio senser which produces a control pressure such that the ratio of control pressure to one of the pressures of the pressure ratio is proportional to the pressure ratio.

Another object of the invention is to provide a constant Mach number control for an aircraft powered by a jet engine which utilizes a pressure ratio sensing device to produce a control pressure for controlling the thrust output of the engine in accordance with flight Mach number.

A further object of the invention is the provision of an air spring which acts against the differential between the two pressures of a pressure ratio and provides a variable spring force.

These and other objects of the invention, not specifically set forth above will become readily apparent from the accompanying description and drawings, in which:

FIGURE 1 is a diagrammatic view of the pressure ratio sensing device of this invention.

FIGURE 2 is a diagrammatic view of a ramjet engine equipped with a Mach number control system utilizing the pressure ratio senser of this invention.

Referring to FIGURE 1, the pressure ratio sensing device 5 has a casing 6 which supports a first diaphragm 7 positioned between spaces 8 and 9 within the casing. A passage 10 connects the space 8 with a pressure divider 11, which comprises a casing 12 defining an orifice 13 connecting space 14 with space 15. A needle valve 16 is threaded to casing 12 and rotation of the valve handle 17 serves to vary the throat area of orifice 13. The space 14 is connected with passage 18 which contains an orifice 19 at its end and passage 18 connects with the higher pressure $P_1$ of the pressure ratio to be sensed. The space 15 is connected through passage 20 to a low exhaust pressure $P_0$ so that the pressure differential between pressures $P_1$ and $P_0$ will be sufficient to cause sonic velocity flow at the throats of orifices 13 and 19 and thus choke the orifice. The passage 10 connects with the space 14 between the two orifices and measures a pressure ($KP_1$) which is a fraction of the pressure $P_1$ determined by the ratio between the throat areas of orifices 19 and 13. The presure $KP_1$ can, of course, be varied by adjustment of the needle valve 16 to change the throat area of orifice 13. The space 9 is connected to the lower pressure $P_2$ of the pressure ratio through passage 21 so that the diaphragm 7 receives a force represented by $KP_1-P_2$.

A rod 22 is slidably mounted in partition 23 of casing 6 and has a threaded end 24 passing through an opening in diaphragm 7. The end 24 carries rigid members 25 and 26 positioned on opposite sides of the diaphragm and a nut 27 clamps these members against a portion of the diaphragm and secures the rod 22 to the diaphragm. The casing 6 has a threaded opening 28 for receiving the threaded portion 29 of a stop 30 which projects into space 8 and is positioned opposite the threaded end 24 of rod 22. A nut 31 carried by portion 29 serves to lock the stop 30 in any selected position and leakage past the stop is prevented by sealing ring 32. Another stop 33 is carried by partition 23 and the stops 30 and 33 serve to limit the movement of the diaphragm in opposite directions.

A second diaphragm 34 is supported by casing 6 between spaces 35 and 36 and space 35 is connected to space 9 by a passage 37 in partition 23 so that space 35 receives the pressure $P_2$. Rod 22 has a second threaded end 38 which passes through an opening in diaphrgam 34 and rigid members 39 and 40 are carried by end 38 on opposite sides of the diaphragm. A nut 41 serves to clamp members 39 and 40 against the diaphragm and also serves to connect the diaphragm to rod 33. The end 38 carries a needle valve 42 which cooperates with an orifice 43 formed at the end of passage 44 which passes through the casing 6. The passage 44 has a portion 45 which is threaded into an opening 46 in the casing. Nut 47 is received by the portion 45 in order to lock the passage 44 in any selected position and sealing ring 48 prevents leakage around the passage. The pressure $P_1$ is introduced to space 36 through passage 49 which contains an orifice 50 and the space 36 exhausts to the lower pressure $P_0$ through passage 44. Thus, the orifices 43 and 50 form the two choked orifices of a second pressure divider and the control pressure $P_3$ existing in space 36 between the orifices is sensed in passage 51 connected to space 36.

It is apparent that movement of the rod 22 as a result of the forces acting on diaphragms 7 and 34 will cause the needle valve 42 to vary the throat area of orifice 43 and thus vary the control pressure sensed in passage 51.

When the pressures on diaphragm 7 balance the pressures on diaphragm 34, the following Equation 1 results:

(1) $\qquad (KP_1-P_2)A_1 = (P_3-P_2)A_2$ where $A_1$ is the area of diaphragm 7 and $A_2$ is the area of diaphragm 34. Solving for $P_3$ in terms of the pressure ratio $P_1/P_2$, the following Equation 2 is obtained.

(2) $\qquad P_3/P_1 = (K-P_2/P_1)A_1/A_2 + P_2/P_1$

Since the diaphragm area ratio $(A_1/A_2)$ is fixed and the valve of K is fixed for any given setting of the needle 16, the ratio of control pressure $P_3$ to pressure $P_1$ is inversely proportional to the pressure ratio $P_1/P_2$. Thus, the pressure ratio senser device is capable of directly producing a control pressure solely from the two pressures of the pressure ratio and no external feed back of either of the pressures is necessary.

The operation of the sensing device 5 will be described in connection with the fuel control system for the ramjet engine illustrated in FIGURE 2. The engine comprises a duct 52 having an exit nozzle 53 and a diffuser body 54 is supported at the duct entrance by means of struts 55. Fuel injectors 56 are connected to fuel valve 71 of fuel regulator 57 through fuel line 58 and fuel is supplied to the regulator from passage 59. The complete sensing device 5 disclosed in FIGURE 1 is illustrated in block form in FIGURE 2 and is connected to the regulator 57 through passage 51 containing the control pressure $P_3$.

The passages 18 and 49 of the pressure ratio sensing device 5 receives the pressure $P_1$ from passage 60 connected to pressure probe 61. This probe measures the total pressure at the inlet station which is usually designated as $P'_{T_1}$. The pressure $P_2$ is received by passage 21 from passage 62 connected to pressure probe 63 located at the nose of diffuser and this probe measures the free stream total pressure reduced by normal shock, which pressure is usually designated $P'_{T_0}$. Passage 64 connects the passage 44 with the exhaust pressure $P_0$ which is selected as the free stream static pressure at opening 65. Thus, the contral pressure in passage 51 will be determined by the pressure $P_1$ or ($P'_{T_1}$) and by the pressure ratio $P_1/P_2$ or $P'_{T_1}/P_{T_0}$. The fuel regulator 57 consists of a casing 66 containing a diaphragm 67 which receives the force of spring 68 on one side thereof. This same side is connected to passage 51 to receive the control pressure $P_3$, while the other side of the diaphragm receives the pressure $P_1$ from passage 69. An arm 70 is connected between diaphragm 67 and fuel valve 71 and this valve controls the fuel flow to the engine.

The thrust output of the engine is proportional to the fuel-air ratio which in turn is proportional to the pressure ratio $P_3/P_1$ because fuel flow is proportioned to $P_1-P_3$ and air-flow is proportional to $P_1$. Referring to Equation 2, it is seen that the ratio $P_3/P_1$ varies as a straight line function of the pressure ratio $P_2/P_1$ between rich and lean limits and is constant at the limits. Thus, the control pressure differential $P_1-P_3$ maintains a fuel flow which causes the engine to produce a thrust inversely proportional to $P_1/P_2$ and since the ratio $P_1/P_2$ bears a fixed relationship to flight Mach number, the control pressure differential $P_1-P_3$ will control the thrust in proportion to flight Mach number. It will be noted from Equation 2 that the operating slope of the control system ($P_3/P_1$ vs. $P_1/P_2$) will be determined by the ratio of the diaphragm areas and that the value of K will be determined by the setting of needle valve 16.

In actual operation, the end 24 of rod 22 will bear against stop 30 until the pressure ratio $P_1/P_2$ increases to a value where the differential between $KP_1$ and $P_2$ on diaphragm 7 overcomes the differential between $P_3$ and $P_2$ on diaphragm 34. The setting of the stop 30 is such that the control pressure $P_3$, which is a function of pressure $P_1$ and position of needle valve 42, cannot call for a fuel flow which would exceed the rich limit of the engine. As the flight speed increases, the pressure $P_1$ will increase to increase the air flow through the engine and at the same time, the control pressure $P_3$ will increase proportionally with $P_1$. Since the pressure $P_3$ acts against the pressure $P_1$ on diaphragm 67, the diaphragm will move to the left to increase the fuel flow through valve 71 at a rate such that the fuel-air ratio remains at the rich limit. In other words, the pressure differential on diaphragm 67 will increase with increase in pressure $P_1$ even though the pressure $P_3$ remains the same fraction of pressure $P_1$.

As the engine approaches the cruise flight speed, the pressure ratio $P_1/P_2$ will become great enough to move rod 22 to the right in FIGURE 1 and reduce the throat area of orifice 43. As the throat area is reduced, the control pressure $P_3$ becomes a continually larger fraction of the pressure $P_1$. Thus, for a given increase in pressure $P_1$, the differential on the diaphragm 67 will not increase as fast as when the throat area remained constant. Therefore, an increase in pressure $P_1$ will continue to move the valve 71 to increase the fuel flow but at a slower rate so that the fuel-air ratio will decrease. When the fuel-air ratio has been reduced to the cruise value, the flight speed will thereafter be maintained at the cruise value. If the thrust should thereafter increase, the flight speed would increase and cause a decrease in fuel-air ratio which would reduce the thrust and flight speed. In the event the thrust should decrease, the flight speed would decrease and cause an increase in fuel-air ratio which would increase the thrust and flight speed. Thus, the needle valve 42 will select a throat area for orifice 43 which will result in a balancing of the forces on diaphragm 67 when the fuel-air ratio reaches the cruise thrust valve, and thereafter any change in pressure $P_1$ and the pressure ratio $P_1/P_2$ will vary control pressure $P_3$ in such a manner as to restore the cruise thrust by restoring the equilibrium on diaphragm 67. Since the pressure ratio sensing device serves to maintain the ratio $P_2/P_1$ at a constant value corresponding to cruise thrust value, the device also serves to maintain a constant flight Mach number because the ratio $P_1/P_3$ is maintained proportional to the ratio $P_1/P_2$ which in turn is a function of flight Mach number.

By adjusting the position of the stop 30, any value of rich limit can be selected since the position of stop 30 governs the position of needle 42 and the maximum throat area of orifice 43. Thus, by moving the stop to the left in FIGURE 2, a higher rich limit is selected since the maximum differential between pressures $P_1$ and $P_3$ will be greater to cause greater fuel flow. Also, the value of lean limit can be varied by adjusting the position of orifice 43. If the orifice is positioned to the right in FIGURE 1, a higher value of lean limit is selected since maximum movement of needle valve 42 to the right as determined by stop 33 will cause less reduction in the throat area of the orifice 43. Also, as previously mentioned, adjustment of the needle valve 16 will set the value of K to determine the pressure ratio $P_1/P_2$ at which the needle valve 42 will commence to move. For instance, by decreasing the area of orifice 13 by needle valve 16, the pressure $KP_1$ will be increased for any given value of pressure $P_1$ so that a greater pressure will act on diaphragm 7. Since the operating slope of the device is determined by the area ratio of diaphragm 7 to diphragm 34, the change in $P_3/P_1$ per unit change in $P_2/P_1$ can be increased or decreased by increasing or decreasing the area ratio.

While the invention has been described in connection with the control of engine thrust, it is apparent that the pressure ratio sensing device can receive any two pressures of a pressure ratio and produce a control signal whose ratio with the higher pressure of the pressure ratio varies inversely with the pressure ratio. Thus pressures P₁ and P₂ can be taken from any process or machine and the input to the process can be controlled by the control pressure P₃. The ratio $P_3/P_1$ varies as a straight line function of the ratio $P_2/P_1$ between operating limits of the device so that the output of the pressure ratio senser device can be utilized in connection with any suitable regulator to maintain any selected value of the ratio $P_3/P_1$. In the case of a jet engine, the ratio $P_3/P_1$ is representative of the fuel-air ratio and thrust. By holding this ratio constant, the flight speed is also held constant since flight speed is proportioned to thrust.

The action of the diaphragm 34 is equivalent to that of an air spring acting on diaphragm 7. Assuming that passage 51 is disconnected from the regulator 57 and that the pressure P₁ is continually present in space 36, the diaphragm 34 would have the effect of simply reducing the effective area of diaphragm 7 and rod 22 would move in accordance with the differential between pressures P₁ and P₂. In this case, the diaphragm 34 would represent a spring having a fixed spring constant. However, by utilizing the pressure divider, consisting of orifices 43 and 50, it is possible to vary the pressure P₃ on diaphragm 34 so that movement of diaphragm 7 is resisted by a variable force which increases with displacement of diaphragm 7 to the right in FIGURE 1. In other words, the movement of needle valve 42 causes a change in pressure P₃ relative to pressure P₁ and this changes the spring force of diaphragms 34 against the diaphragm 7. The position of needle valve 42 can be utilized as a measure of the pressure ratio $P_2/P_1$ since at some position of needle valve 42, the pressure P₃ will become great enough to cause the force of diaphragm 34 to balance the force of diaphragm 7. This relationship is shown as follows:

$$\frac{P_3}{P_1} = f\left(\frac{P_2}{P_1}\right)$$

and $$\frac{P_3}{P_1} = \frac{A_{50}}{A_{43}} = \frac{K}{f(x)} = f'(x)$$

where $A_{50}$ is the throat area of orifice 50 which is a constant K and $A_{43}$ is the throat area of orifice 43 which is variable with position $(x)$ of needle valve 42. The air spring can have a force vs. displacement curve of any chosen configuration by simply varying the contour of needle valve 42 in order to obtain the necessary area change of orifice 43 with movement of needle valve 42.

The present invention provides a very simple pressure ratio senser which is relatively insensitive to pressure and temperature level changes and which has a high response rate. When the invention is utilized to produce a Mach number control signal for a jet engine, it is not necessary to sense atmospheric static pressure which is very difficult to accurately obtain. The invention also permits a gradual reduction in thrust as the cruise Mach number is approached and this gradual reduction in thrust results in stable operation of the jet engine control system. It is understood that various types of regulators can utilize the control pressure P₃ for control purposes and the invention is not limited to the use of a fuel flow regulator such as disclosed. Various other modifications are contemplated by those skilled in the art without departing from the spirit and scope of the invention as hereinafter defined in the appended claims.

What is claimed is:

1. A device for controlling the flight Mach number of an aircraft propelled by a jet engine comprising means for sensing a first engine pressure which is proportional to engine air flow, means for sensing a second engine pressure whose ratio to said first pressure is proportional to flight Mach number, means responsive to said first and second pressures for producing a control pressure whose ratio to said first pressure varies as a straight line function of the ratio between said first and second pressure and means responsive to said control pressure and said first pressure for controlling the fuel flow to said engine in accordance with the ratio of said control pressure to said first pressure, the thrust output of said engine being proportional to said last mentioned ratio and to flight Mach number.

2. A device as defined in claim 1 wherein said controlling means comprises differential means receiving said first pressure on one side and said control pressure on the opposite side, spring means acting on said opposite side and fuel valve means connected to said differential means for controlling the fuel flow to said engine.

3. A device as defined in claim 1 wherein said producing means comprises first differential means for exerting a constant fraction of said first pressure against said second pressure, second differential means for exerting said pressure against a variable fraction of said first pressure, connecting means for connecting said first and second differential means together so that said second pressure on said first means acts against said second pressure on said second means, said first and second means having different pressure responsive areas, and means controlled by the movement of said first and second means for varying the fraction of said first pressure acting on said second means until all the pressures acting on said first and second means are in balance, said variable fraction pressure being utilized as said control pressure.

4. A device as defined in claim 3 wherein the area ratio between said first and second means determines the scope of said straight line function and the constant fraction of said first pressure selected to act on said first means determines the lowest value of the ratio between said first and second pressure at which said first and second means experience movement, first stop means for limiting said movement in one direction to prevent the rich fuel limit of said engine from being exceeded and second stop means for limiting said movement in the opposite direction to prevent the lean fuel mixture from dropping below the lean limit.

5. A device for controlling the flight Mach number of an aircraft propelled by a jet engine comprising means for sensing the total pressure at the inlet station of the engine ($P'_{T_1}$), means for sensing the free stream total pressure reduced by normal shock ($P'_{T_0}$), means for producing a control pressure (P₃) from said pressures ($P'_{T_1}$) and ($P'_{T_0}$) such that the ratio ($P_3/P'_{T_1}$) is proportional to the ratio ($P'_{T_0}/P'_{T_1}$), and pressure regulator means responsive to said control pressure (P₃) and to pressure ($P'_{T_1}$) for regulating the fuel flow to said engine to obtain a constant cruise thrust from said engine.

References Cited in the file of this patent

UNITED STATES PATENTS

| | | |
|---|---|---|
| 2,792,685 | Constantino | May 21, 1957 |
| 2,850,871 | Drake | Sept. 9, 1958 |
| 2,864,393 | Drake | Dec. 16, 1958 |
| 2,934,898 | Graefe | May 3, 1960 |
| 3,027,904 | Silver | Apr. 3, 1962 |